No. 889,742. PATENTED JUNE 2, 1908.
J. ALTMEYER.
REIN HOLDER AND TIGHTENER FOR VEHICLES.
APPLICATION FILED MAY 7, 1907.
*Fig. 1.*
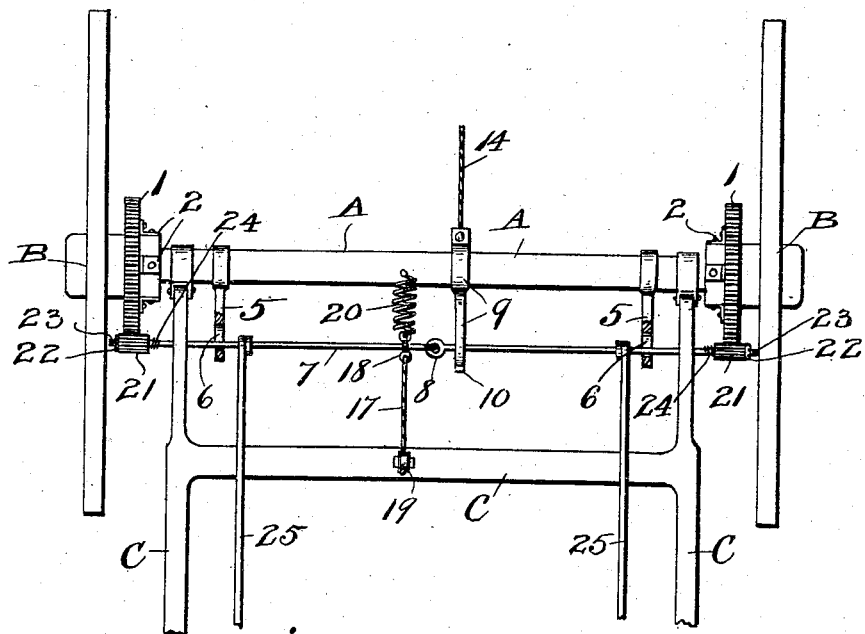
*Fig. 4.* *Fig. 5.*
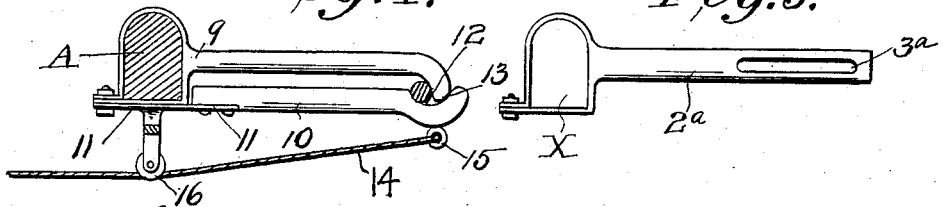
*Fig. 2.*
*Fig. 3.*
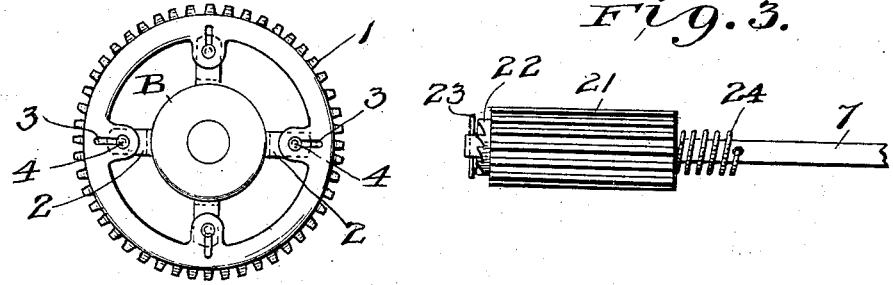
Witnesses Inventor
Jacob Altmeyer
By
Attorney
THE NORRIS PETERS CO., WASHINGTON, D. C.

UNITED STATES PATENT OFFICE.

JACOB ALTMEYER, OF EAST SPOKANE, WASHINGTON.

REIN HOLDER AND TIGHTENER FOR VEHICLES.

No. 889,742.  Specification of Letters Patent.  Patented June 2, 1908.

Application filed May 7, 1907. Serial No. 372,413.

*To all whom it may concern:*

Be it known that I, JACOB ALTMEYER, a citizen of the United States, residing at East Spokane, in the county of Spokane and State of Washington, have invented certain new and useful Improvements in Rein Holders and Tighteners for Vehicles, of which the following is a specification.

My invention relates to devices for checking runaway draft animals and consists of a shaft adapted to be thrown into gear with the wheels of the vehicle to which the reins are secured so that as the vehicle moves forward the reins are wrapped on the shaft and the animal is checked.

My invention will be described in detail hereinafter and will be illustrated in the accompanying drawings in which—

Figure 1 is a plan view of the axle and front wheels of a vehicle showing my invention installed thereon, Fig. 2, a detail view of one of the wheel hubs and the gear wheel secured thereto, Fig. 3, a detail view of one of the ends of the shaft, Fig. 4, a detail view of the clamp for holding the shaft in gear with the vehicle wheels, and Fig. 5, a detail view of one of the slotted arms for supporting the shaft.

In the drawings similar reference characters indicate corresponding parts throughout the several views.

A indicates the front axle of a vehicle, B the wheels and C the thills. Secured to the hub of each wheel B is a gear wheel 1 by means of angular supports 2, the wheel 1 being provided with radial slots 3 to receive bolts 4 secured through angular supports 2.

5 indicates arms secured to axle A having elongated holes 6 therein, 7 indicates a shaft having a universal joint 8 in its middle, the two sections of the shaft being mounted in the holes 6 in arms 5. The middle portion of shaft 7 adjacent to universal joint 8 is supported by a clamping member consisting of an arm 9 secured to axle A and another arm 10 having a leaf spring 11 secured thereto and to axle A. The forward end of arm 10 is provided with a depression 12 and the arm 9 with a downwardly extending lug 13 on its end to seat in said depression 12.

14 indicates a chain or rope secured to perforated ear 15 on the lower side of the end of arm 10 which passes around pulley 16 journaled under axle A and extends from thence up into the vehicle.

17 indicates a chain or rope secured to a ring 18 on shaft 7 and passing around pulley 19 secured to the thills C.

20 indicates a coil spring secured to ring 18 and to axle A.

21 indicates a pinion on each end of shaft 7 having ratchet 22 on its outer end to engage a pin 23 on the end of the shaft, being held in engagement by means of a coil spring 24.

25 indicates the reins secured to shaft 7.

It will be understood that when chain or rope 17 is pulled the shaft 7 is straightened so that the pinions 21 mesh with gear wheels 1 the shaft being held in this position by being seated in depression 12 of arm 11. While in this position should the animal start forward the reins 25 would be wrapped on shaft 7 effectually checking it. It will also be understood from my construction that should the animal start in a circle so that only one wheel would be turning in a forward direction the shaft 7 will be turned as effectually as if both wheels were turning in a forward direction, the shaft rotating in the pinion in gear with the wheel that is not turning by means of the ratchet on the end of the pinion and the pin on the end of the shaft. By pulling on chain or rope 14 the arm 10 is drawn down against the resilience of spring 11, shaft 7 is released to the action of spring 20 and its jointed portion drawn back towards axle A and the pinions 21 thrown out of engagement with gear wheels 1.

In Fig. 5 is shown a modification in which X indicates the rear axle and Y the rear wheels of the vehicle, $1^a$ the gear wheel secured to one of the rear wheels Y, $2^a$ an arm secured to axle X having a longitudinal slot $3^a$ therein, $4^a$ another arm, $5^a$ a shaft journaled at one end in arm $4^a$ and slidably mounted in slot $3^a$. $6^a$ indicates a pinion secured to the end of shaft $5^a$ that meshes with the wheel $1^a$ when the shaft is in its rearmost position, $7^a$ a rod for operating shaft $5^a$ and $8^a$ the reins secured to the shaft.

When the shaft $5^a$ is actuated so that the pinion $6^a$ is in mesh with gear wheel $1^a$ it will be apparent that forward progress of the vehicle will rotate shaft $5^a$ and wind the reins $8^a$ thereon so that the animal will be checked. When the pinion $6^a$ is not in mesh with gear wheel $1^a$ the shaft $5^a$ will turn freely and any windings of the reins $8^a$ will be unwrapped.

Having thus described my invention what I claim is—

1. In combination with the axle of a vehicle, and the wheels thereon, a shaft mounted on said axle consisting of two parts joined by a universal joint, the driving reins secured to the shaft, means to straighten said shaft or to break it at the joint aforesaid, and gearing to connect the shaft and the wheels, substantially as shown and described.

2. In combination with the axle of a vehicle, and the wheels thereon, gear wheels secured to the hubs of the wheels, a shaft mounted on said axle consisting of two parts joined by a universal joint, pinions on the ends of the shaft, the driving reins secured to the shaft, means to break said shaft at the joint to throw the pinions out of mesh with the gear wheels, and means to straighten the shaft so as to throw the pinions into mesh with the gear wheels, substantially as shown and described.

3. In combination with the axle of a vehicle, and the wheels thereon, gear wheels secured to the hubs of the wheels, arms secured to the axle having elongated holes therein, a shaft fragment mounted in the hole in each arm, said shaft fragments joined by a universal joint, a pinion secured to the free end of each shaft fragment and adapted to mesh with one of the gear wheels on the hubs, the driving reins secured to the shaft, means to break said shaft at the joint to throw the pinions out of mesh with the gear wheels, and means to straighten the shaft so as to throw the pinions into mesh with the gear wheels, substantially as shown and described.

4. In combination with the axle of a vehicle, and the wheels thereon, gear wheels secured to the hubs of the wheels, arms secured to the axle having elongated holes therein, a shaft fragment mounted in the hole in each arm, said shaft fragments joined by a universal joint, a pinion secured to the free end of each shaft fragment and adapted to mesh with one of the gear wheels on the hubs, the driving reins secured to the shaft, a coil spring to normally hold the shaft broken at the universal joint so that the pinions are out of mesh with the gear wheels, means to straighten the shaft against the resilience of the spring so as to throw the pinions into mesh with the gear wheels, and a spring clamp to hold the shaft in a straight position, substantially as shown and described.

5. In combination with the axle of a vehicle, and the wheels thereon, gear wheels secured to the hubs of the wheels, arms secured to the axle having elongated holes therein, a shaft fragment mounted in the hole in each arm, said shaft fragments joined by a universal joint, a pinion mounted on the free end of each shaft fragment having ratchets on their outer ends, a pin on the outer end of each shaft fragment to engage the ratchet on the pinion, a spring engaging the other end of the pinion to hold the ratchet and pin in engagement, a coil spring secured to the shaft and the axle to normally hold the shaft broken at the universal joint so that the pinions are not in mesh with the gear wheels, a flexible member secured to the shaft to straighten the shaft against the resilience of the spring aforesaid so that the pinions mesh with the gear wheels, and a spring clamp to hold the shaft straightened, substantially as shown and described.

In testimony whereof I hereto affix my signature in the presence of two witnesses.

JACOB ALTMEYER.

Witnesses:
  GEORGE R. LOVEJOY,
  JOHN LUFT.